(12) United States Patent
Tsuchiya (10) Patent No.: US 10,417,657 B2
(45) Date of Patent: Sep. 17, 2019

(54) POINT MANAGEMENT APPARATUS, SYSTEM, AND METHOD

(71) Applicant: STOCK POINT Inc., Tokyo (JP)

(72) Inventor: Kiyomi Tsuchiya, Tokyo (JP)

(73) Assignee: STOCK POINT INC., Tokyo (JP)

( * ) Notice: Subject to any disclaimer, the term of this patent is extended or adjusted under 35 U.S.C. 154(b) by 344 days.

(21) Appl. No.: 15/495,789

(22) Filed: Apr. 24, 2017

(65) Prior Publication Data

US 2017/0308920 A1 Oct. 26, 2017

(30) Foreign Application Priority Data

Apr. 25, 2016 (JP) .................................. 2016-086762

(51) Int. Cl.
*G06Q 30/00* (2012.01)
*G06Q 30/02* (2012.01)

(52) U.S. Cl.
CPC ................ *G06Q 30/0226* (2013.01)

(58) Field of Classification Search
CPC ........................................... G06Q 30/00–0284
USPC ............................................. 705/14.1–14.73
See application file for complete search history.

(56) References Cited

U.S. PATENT DOCUMENTS

2002/0052818 A1* 5/2002 Loveland ............... G06Q 40/04
705/36 R
2012/0203608 A1* 8/2012 Lele ....................... G06Q 30/00
705/14.18

OTHER PUBLICATIONS

Wikipedia Entry for "Loyalty Program" (https://ja.wikipedia.org/wiki/%E3%83%9D%E3%82%A4%E3%83%B3%E3%83%88%E3%82%B5%E3%83%BC%E3%83%93%E3%82%B9), with English translation. Publication date unknown.

* cited by examiner

*Primary Examiner* — John Van Bramer
(74) *Attorney, Agent, or Firm* — Womble Bond Dickinson (US) LLP (57) ABSTRACT

A point management apparatus includes a storage device configured to store point information about points awarded to a user, the point information including a point ID for identifying the points, a point rate indicating an amount of money per unit point of the points, a stock price and the number of shares of a designated company of when purchased as capital for the points, a user ID for identifying the user, a balance of points owned by the user identified by the user ID, and stock information about a stock of the designated company, which is used to calculate the balance of the points, an arithmetic circuit configured to update the balance of the points owned by the user, which is stored in the storage device, by calculating, based on a new stock price of the designated company, the balance of the points owned by the user read out from the storage device, and the stock information read out from the storage device, the balance of the points owned by the user, and a terminal processing circuit configured to read out, in response to a request from the user, the balance of the points owned by the user from the storage device, and notify a terminal apparatus of the user of the balance via the communication network. Point management system and method are also disclosed.

16 Claims, 8 Drawing Sheets

■ DATE AND TIME: t = T2 REQUEST FOR POINT BALANCE INQUIRY OF COMPANY A FROM USER U

| USER ID | POINT ID | POINT BALANCE X(t) | UPDATE DATE AND TIME t | NUMBER Q OF DISTRIBUTED SHARES |
|---|---|---|---|---|
| U | A | 100 sp | T0 | 8,000 YEN/SHARE |

| NEW STOCK PRICE | P (T2) | 10,000 YEN/SHARE |
|---|---|---|

POINT BALANCE $X(T2) = X(T0) \times \frac{P(T2)}{P(T0)} = 100 \times \frac{10,000}{8,000}$ = 125 sp

| USER ID | POINT ID | POINT BALANCE X(t) | UPDATE DATE AND TIME t | STOCK PRICE P(t) AT TIME OF UPDATE |
|---|---|---|---|---|
| U | A | 125 sp | T2 | 10,000 YEN/SHARE |

| PURCHASE FUND W | 1,000,000 YEN |
|---|---|
| PURCHASE STOCK PRICE P | 8,000 YEN/SHARE |
| NUMBER N OF PURCHASED SHARES | 125 SHARES |
| POINT RATE R | 1 YEN/sp |
| NUMBER M OF ISSUED POINTS = P × N/R | 1,000,000 sp |

FIG.3

POINT ISSUANCE TABLE

| POINT ID | COMPANY ID | PURCHASE FUND W | RATE R | REFERENCE DATE AND TIME T0 | REFERENCE STOCK PRICE P(T0) | REFERENCE NUMBER N OF SHARES | NUMBER M OF ISSUED POINTS |
|---|---|---|---|---|---|---|---|
| | | | | ⋮ | | | |

FIG.4

POINT BALANCE TABLE

| USER ID | POINT ID | POINT BALANCE X(t) | UPDATE DATE AND TIME t | NUMBER Q OF DISTRIBUTED SHARES |
|---|---|---|---|---|
| | | ⋮ | | |

FIG.6A

■ DATE AND TIME: t = T1 REQUEST FOR NEW REGISTRATION FOR STOCK POINTS OF 100 sp OF COMPANY A FROM USER U

| NUMBER OF POINTS TO BE REGISTERED | $\Delta X$ | 100 sp | |
|---|---|---|---|
| BALANCE OF NUMBER OF SHARES | $Q = \Delta X \times \dfrac{R}{P(T0)} = 100 \times \dfrac{1}{8,000}$ | | 0.0125 SHARES |

⇨

| USER ID | POINT ID | POINT BALANCE X(t) | UPDATE DATE AND TIME t | NUMBER Q OF DISTRIBUTED SHARES |
|---|---|---|---|---|
| U | A | 100 sp | T0 | 0.0125 SHARES |

FIG.6B

■ DATE AND TIME: t = T2 REQUEST FOR POINT BALANCE INQUIRY OF COMPANY A FROM USER U

| USER ID | POINT ID | POINT BALANCE X(t) | UPDATE DATE AND TIME t | NUMBER Q OF DISTRIBUTED SHARES |
|---|---|---|---|---|
| U | A | 100 sp | T0 | 0.0125 SHARES |

| NEW STOCK PRICE | P (T2) | 10,000 YEN/SHARE |
|---|---|---|

| POINT BALANCE | $X(T2) = N(T0) \times P(T2)$ | 125 sp |
|---|---|---|

⇨

| USER ID | POINT ID | POINT BALANCE X(t) | UPDATE DATE AND TIME t | NUMBER Q OF DISTRIBUTED SHARES |
|---|---|---|---|---|
| U | A | 125 sp | T2 | 0.0125 SHARES |

POINT BALANCE TABLE

| USER ID | POINT ID | POINT BALANCE X(t) | UPDATE DATE AND TIME t | STOCK PRICE P(t) AT TIME OF UPDATE |
|---|---|---|---|---|
| | | ⋮ | | |

FIG.9A

■ DATE AND TIME: t = T1 REQUEST FOR NEW REGISTRATION FOR STOCK POINTS OF 100 sp OF COMPANY A FROM USER U

| NUMBER OF POINTS TO BE REGISTERED | ΔX | 100 sp |
|---|---|---|

⇨

| USER ID | POINT ID | POINT BALANCE X(t) | UPDATE DATE AND TIME t | STOCK PRICE P(t) AT TIME OF UPDATE |
|---|---|---|---|---|
| U | A | 100 sp | T0 | 8,000 YEN/SHARE |

FIG.9B

■ DATE AND TIME: t = T2 REQUEST FOR POINT BALANCE INQUIRY OF COMPANY A FROM USER U

| USER ID | POINT ID | POINT BALANCE X(t) | UPDATE DATE AND TIME t | NUMBER Q OF DISTRIBUTED SHARES |
|---|---|---|---|---|
| U | A | 100 sp | T0 | 8,000 YEN/SHARE |

| NEW STOCK PRICE | P (T2) | 10,000 YEN/SHARE |
|---|---|---|

| POINT BALANCE | $X(T2) = X(T0) \times \dfrac{P(T2)}{P(T0)} = 100 \times \dfrac{10,000}{8,000}$ | 125 sp |
|---|---|---|

⇨

| USER ID | POINT ID | POINT BALANCE X(t) | UPDATE DATE AND TIME t | STOCK PRICE P(t) AT TIME OF UPDATE |
|---|---|---|---|---|
| U | A | 125 sp | T2 | 10,000 YEN/SHARE |

FIG.10

POINT MANAGEMENT APPARATUS, SYSTEM, AND METHOD

BACKGROUND OF THE INVENTION

The present invention relates to a point management technique for managing the balance of points awarded to a user.

These days, a generally provided point program is a program for distributing points to the user who has purchased a product or used a service, and providing a privilege such as exchange with a specific gift or a discount service in accordance with the balance of the points. This point program encourages the user to purchase products as targets of the point program or use services as targets of the point program to get a desired privilege, thereby improving a user willingness to purchase the products or use the services (see, for example, "loyalty program" https://ja.wikipedia.org/wiki/%E3%83%9D%E3%82%A4%E3%83%B3%E3%83%88% E3%82% B5% E3%83% BC % E3%83%93% E3%82% B9, Wikipedia or the like).

In recent years, to provide products or services, in addition to improvement of the values of the products or services, importance is placed on so-called branding for creating the company's image and brand. This is because it is possible to improve the customer's loyalty to the company by giving the user the image of "trust", "peace of mind", and "high quality" to differentiate the company from the others.

However, the existing point program can improve the user's willingness to purchase a specific product as a target of the point program or use a specific service as a target of the point program but cannot improve the customer's loyalty to a specific company.

SUMMARY OF THE INVENTION

It is an object of the present invention to provide a point management technique to improve the customer's loyalty to a specific company.

In order to achieve the above object of the present invention, there is provided a point management apparatus that comprises a storage device configured to store point information relating to points awarded to a user, the point information including a point ID for identifying the points, a point rate indicating an amount of money per unit point of the points, a stock price and a number of shares of a designated company at a time of purchase of a stock of the designated company as capital for the points, a user ID for identifying the user, a balance of points owned by the user identified by the user ID, and stock information on a stock of the designated company that is used to calculate the balance of the points, an arithmetic circuit configured to update the balance of the points owned by the user that is stored in the storage device, by calculating the balance of the points owned by the user, based on a more recent stock price of the designated company than that of the purchased stock price, the balance of the points owned by the user read from the storage device, and the stock information read from the storage device, a communication interface configured to be connected to a communication network, and a terminal processor configured to read the balance of the points owned by the user from the storage device in response to a request from the user, and notify a terminal apparatus of the user of the balance via the communication network.

There is also provided a point management system that comprises a point management apparatus configured to manage a balance of points awarded to a user, and a terminal apparatus of the user connectable to the point management apparatus via a communication network, the point management apparatus including a storage device configured to store point information relating to the points awarded to the user, the point information including a point ID for identifying the points, a point rate indicating an amount of money per unit point of the points, a stock price and a number of shares of a designated company at a time of purchase of a stock of the designated company as capital for the points, a user ID for identifying the user, a balance of points owned by the user identified by the user ID, and stock information on a stock of the designated company that is used to calculate the balance of the points, an arithmetic circuit configured to update the balance of the points owned by the user that is stored in the storage device, by calculating the balance of the points owned by the user, based on a more recent stock price of the designated company than that of the purchased stock, the balance of the points owned by the user read from the storage device, and the stock information read from the storage device, a communication interface configured to be connected to the communication network, and a terminal processor configured to read the balance of the points owned by the user from the storage device, in response to a request from the user, and notify a terminal apparatus of the user of the balance via the communication network.

There is also provided a point management method for a point management system including a communication interface configured to be connected to a communication network, a point management apparatus configured to manage a balance of points awarded to a user, and a terminal apparatus of the user connectable to the point management apparatus via the communication network, the method comprises a step of storing, in a storage device, point information relating the points awarded to the user, the point information including a point ID for identifying the points, a point rate indicating an amount of money per unit point of the points, a stock price and a number of shares of a designated company at a time of purchase of a stock of the designated company as capital for the points, a user ID for identifying the user, a balance of points owned by the user identified by the user ID, and stock information on a stock of the designated company that is used to calculate the balance of the points, a step of updating the balance of the points owned by the user that is stored in the storage device, by calculating the balance of the points owned by the user, based on a more recent stock price of the designated company than that of the purchased stock, the balance of the points owned by the user read from the storage device, and the stock information read from the storage device, and a step of reading, in response to a request from the user, the balance of the points owned by the user from the storage device, and notifying the terminal apparatus of the user of the balance via the communication network.

DESCRIPTION OF THE PREFERRED EMBODIMENTS

Embodiments of the present invention will be described with reference to the accompanying drawings.

First Embodiment

Figure 1:
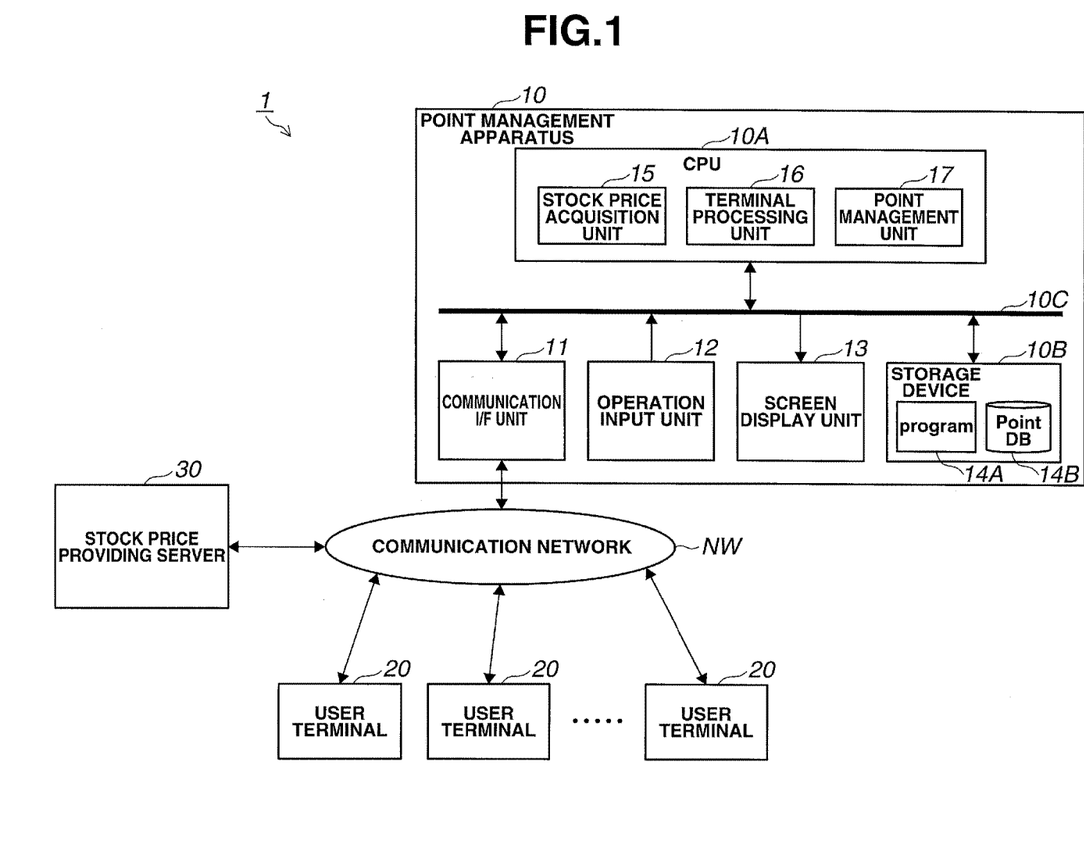
FIG. 1 is a block diagram showing the arrangement of a point management system according to the first embodiment.
Figure 2A:
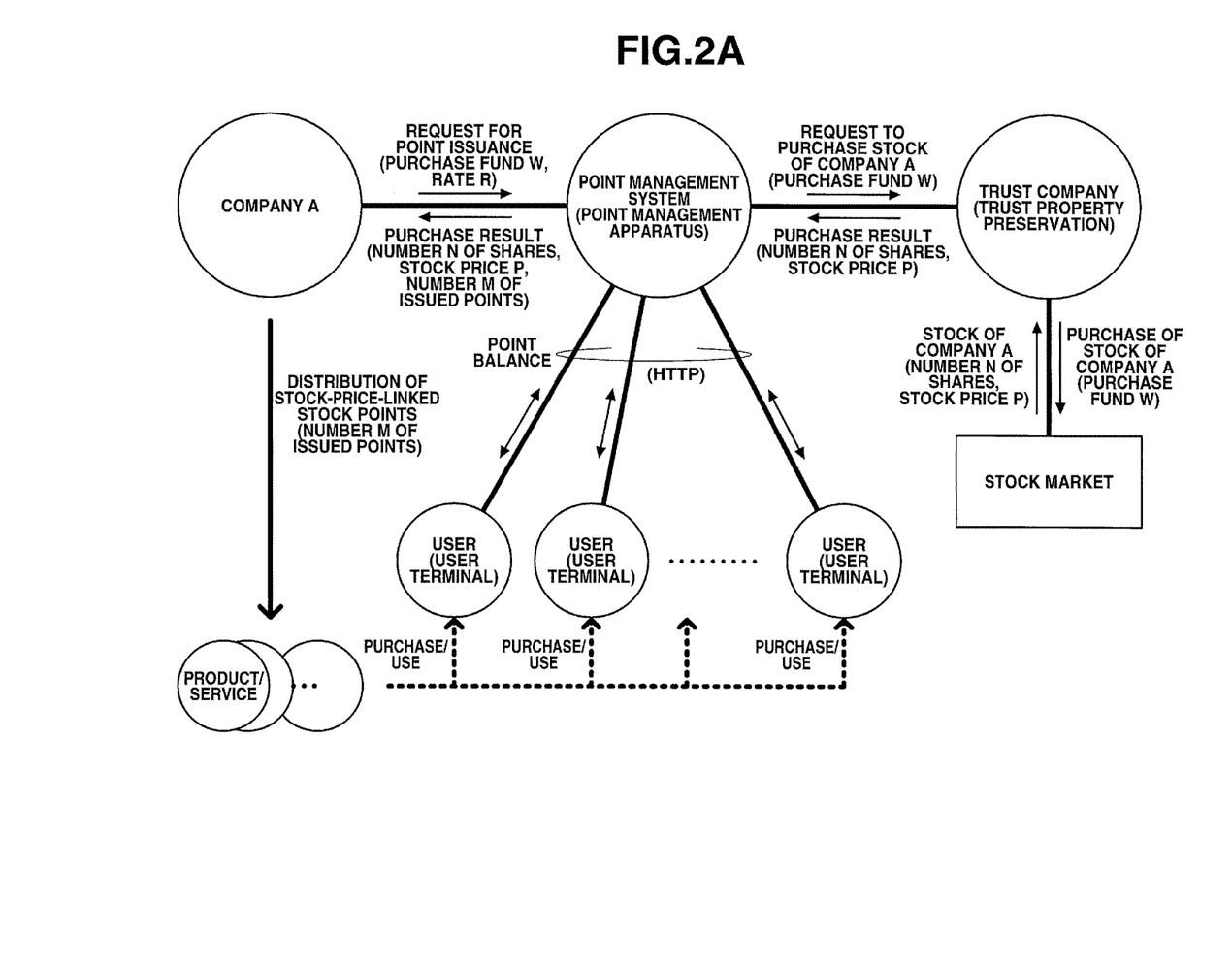
FIG. 2A is a view for explaining an overview of a point program implemented by the point management system according to the first embodiment.
Figure 2B:
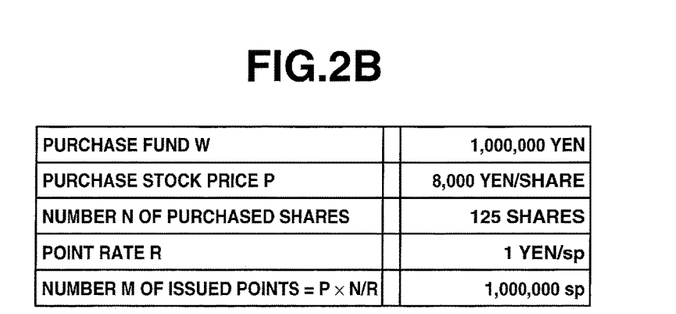
FIG. 2B is a view for explaining the overview of the point program implemented by the point management system according to the first embodiment.

A point management system according to the first embodiment of the present invention will be described with reference to FIG. 1. FIG. 1 is a block diagram showing the arrangement of the point management system according to the first embodiment. FIGS. 2A and 2B are views for explaining an overview of a point program implemented by the point management system according to the first embodiment.

A point management system 1 is a service system for managing the balance (to be also referred to as a "point balance" hereinafter) of points awarded to a user by a company. The point management system 1 includes a point management apparatus 10 for managing the point balance, and a plurality of user terminals 20 connectable to the point management apparatus 10 via a communication network NW.

The point management apparatus 10 is implemented by an information processing apparatus such as a server. This point management apparatus is an information processing apparatus for providing a stock-price-linked point program (to be described later). The detailed arrangement of the point management apparatus 10 will be described later.

The user terminal 20 is an information processing terminal apparatus of a user which uses the point program, such as a smartphone, tablet, or personal computer having a communication function.

[Overview of Point Program]

The point program provided by the point management system according to this embodiment is common to the existing point program in that points are awarded to the user who has purchased a product or used a service, and some privilege is provided in accordance with the balance of the points. However, this point program has a feature in which "stock-price-linked points" indicating that the point balance of the points awarded to the user is linked with the stock price of a company designated in advance, such as a distribution company which has awarded the points or an affiliated company or partner company associated with the distribution company are used. Stock-price-linked points whose point balance is linked with the stock price of a company designated in advance will be referred to as "stock points" hereinafter, and their quantity unit is represented by "sp".

Since the point balance is linked with the stock price of the designated company, the stock of the designated company serves as capital for stock points. An overview of the point program will be described with reference to FIGS. 2A and 2B by exemplifying a case in which a company A plans a promotion by the stock-price-linked point program.

As shown in FIG. 2A, the company A requests, directly or via the operation entity of the stock-price-linked point program, the point management system 1 to issue stock points. At this time, a purchase fund W for purchasing the stock as capital for the stock points and a point rate R indicating an amount of money per unit point (1 sp) of the stock points have been decided. Note that the purchase fund W is decided for each planned promotion in accordance with the scale of the promotion but the point rate R is constant for each company (stock name).

Upon receiving the stock point issuance request, the point management system 1 requests a trust company to purchase the stock of the company A using the purchase fund W. Upon receiving the stock purchase request, the trust company purchases the stock of the company A for the purchase fund W from the stock market. The purchased stock of the company A serves as capital for stock points. The trust company notifies the point management system 1 of, as a purchase result, the stock price of the company A as the capital for the stock points, that is, a stock price P (a stock price at the time of purchase will be referred to as a "reference stock price" hereinafter) of the company A of when the stock is purchased as the capital for the stock points, and the number N of shares which can be purchased (the number of shares of the stock purchased as capital for stock points will be referred to as "the number of purchased shares" hereinafter).

The point management system 1 issues, to the company A, based on the purchase result, stock points whose capital is the purchased stock of the designated company.

At this time, the number M of issued stock points issued by using the purchased stock as capital is calculated based on the reference stock price P, the number N of purchased shares, and the point rate R. As shown in FIG. 2B, for example, if the purchase fund W is 1,000,000 yen and the stock price of the company A is 8,000 yen, the user can purchase 125 (=W/P=1,000,000 yen/8,000 yen) shares of the stock of the company A without considering a commission and fractions. Therefore, if the point rate R is 1 yen/sp, the number M of issued points is 1,000,000 sp (=P=N/R=8,000 yen×125 shares/1).

Note that the thus issued stock points are assigned with a unique point ID every time the stock is purchased. This is done to discriminate the stock points from those issued for other promotions.

The company A assigns the stock points issued from the point management system 1 to a product or service, and distributes them to the user. For example, if the product is a beverage in a plastic bottle, the point ID for identifying the stock points or a QR Code® representing the number of points to be awarded is printed on a label, and the label is pasted on a cap. Alternatively, if the stock points are assigned to an online service, encrypted data including a point ID and the number of points may be awarded through email. The point ID associated with the awarded stock points or the number of points is encrypted, thereby eliminating unauthorized point registration.

The user uses the user terminal 20 to acquire the encrypted data associated with the stock points assigned to the product or service, and requests, from the user terminal 20, the point management apparatus 10 of the point management system 1 to register the stock points by transmitting point information including the encrypted data by a protocol such as HTTP.

This registers the stock points assigned to the product or service in the point management apparatus 10 as the stock points of the user.

After that, the point management apparatus 10 updates the point balance of the stock points of the user every time the timing (to be referred to as the "stock price linkage timing" or "update timing") at which the stock price is reflected on the point balance comes. The stock price linkage timing may be set at intervals of several hours to reflect a variation in stock price, and the point balance may be updated a plurality of times per day. Since, however, the processing load increases in accordance with the number of users, the update operation may be performed once for every predetermined period, for example, per day, per week, or per month. After the closing price during that period is specified, the point balance may be updated based on the closing price.

This links the point balance of the stock points of the user with the stock price P of the company A as the designated company. The user can confirm the point balance by performing a balance inquiry operation using the user terminal 20.

[Point Management Apparatus]

The arrangement of the point management apparatus 10 according to this embodiment will be described in detail with reference to FIG. 1.

As shown in FIG. 1, the point management apparatus 10 according to this embodiment is an information processing apparatus (computer) including a central processing unit (CPU) 10A, a storage device 10B, and various input and output interfaces 11, 12, and 13, all of which are interconnected via a bus 10C.

The storage device 10B is, for example, a hard disk drive (HDD), a semiconductor memory, a magnetooptical disk, or the like. The storage device 10B includes a program storage area storing a point management program 14A. In addition, a point database (to be referred to as a "point DB" hereinafter) 14B (to be described later) is arranged in the storage device 10B.

A computer on which the point management program is installed operates as the point management apparatus 10 including a stock price acquisition unit 15, a terminal processing unit 16, and a point management unit 17 when the CPU 10A executes arithmetic processing in accordance with the point management program to control the storage device 10B and the various input and output interfaces 11, 12, and 13.

The communication interface unit (to be referred to as the "communication I/F unit" hereinafter) 11 is a communication interface circuit configured to be connected to the communication network NW. The communication I/F unit 11 is controlled by the CPU 10A which operates in accordance with the point management program 14A, thereby operating as a "communication interface circuit" according to the present invention. The point management apparatus 10 can perform data communication with the user terminal 20 and a stock price providing server 30 via the communication I/F unit 11.

The operation input unit 12 is formed from operation input devices such as a keyboard, mouse, and touch panel. The point management apparatus 10 can detect, via the operation input unit 12, an operator's operation.

The screen display unit 13 is formed from a screen display device such as an LCD. The point management apparatus 10 can display an operation menu, setting data, and management data on the screen display unit 13.

The point DB 14B is a database storing various kinds of processing information used to manage stock points. The storage device 10B including this point DB 14B corresponds to a storage device according to the present invention. In this embodiment, the point DB 14B stores various kinds of processing information used to manage the stock points in a "point issuance table" and "point balance table".

Figure 3:
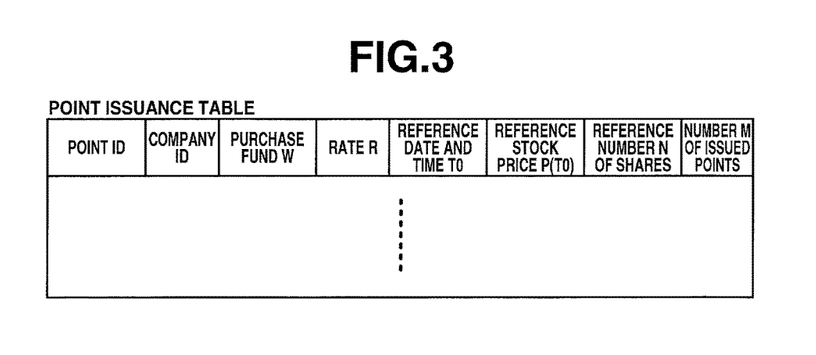
FIG. 3 is a table showing an example of the structure of a point issuance table in the point management system according to the first embodiment.

The point issuance table is a table in which information indicating contents about point issuance requested from a company is registered. The point issuance table stores, in association with each other, the point ID for identifying the stock points different for each designated company or promotion, the point rate R indicating an amount of money per unit point (SP) of the stock points, and a stock price (that is, reference stock price) P(T0) and the number N of purchased shares of the designated company of when the stock is purchased as capital for the stock points. The point issuance table corresponds to the "first table" according to the present invention.

FIG. 3 shows an example of the structure of the point issuance table. In this example, for each point ID for identifying stock points, a set of the company ID for identifying the designated company, the purchase fund W associated with the stock points, the point rate R, a reference date and time T0 indicating the date and time when the stock of the designated company is purchased, the purchase stock price (reference stock price) P(T0) and the number N of purchased shares of the designated company at the reference date and time T0, and the number M of issued points is registered.

Figure 4:
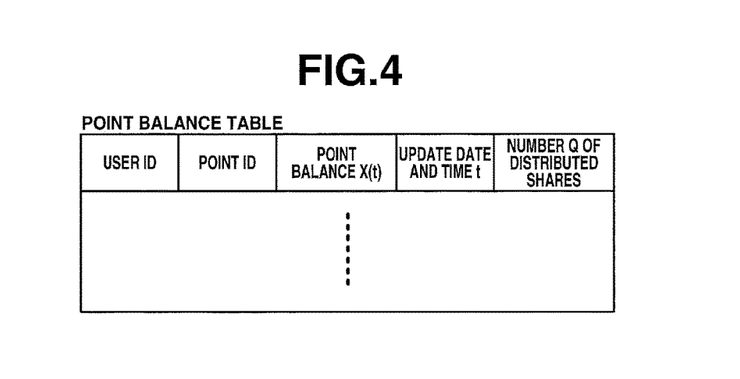
FIG. 4 is a table showing an example of the structure of a point balance table in the point management system according to the first embodiment.

On the other hand, the point balance table is a table in which information about the point balance of the stock points held by the user is registered. More specifically, the point balance table stores, in association with each other, the point ID, the user ID, the balance of the points owned by the user, and information (to be referred to as "stock information" hereinafter) about the stock of the designated company, which is used to calculate the point balance. The stock information indicates the number of shares (to be referred to as "the number of distributed shares" hereinafter) corresponding to the number of points awarded to the user. The point balance table corresponds to the "second table" according to the present invention.

The point management unit 17 registers and updates the information about the point balance when various requests are received from the user terminal 20 or the stock price linkage timing comes.

FIG. 4 shows an example of the structure of the point balance table according to the first embodiment. In the example of FIG. 4, for each user ID for identifying the user, a set of a point ID, a point balance X(t), an update date and time t at which the point balance X(t) is updated, and the number Q of distributed shares corresponding to the point balance X(t) is registered.

Note that the point DB 14B may be formed on the storage device 10B together with the point management program 14A, as shown in FIG. 1, or formed on another storage device (not shown) different from the computer.

The stock price acquisition unit 15 acquires the new stock price of the designated company via the communication network NW. The stock price acquisition unit 15 corresponds to a "stock price acquisition circuit" according to the present invention. In this embodiment, the stock price acquisition unit 15 is implemented by the CPU 10A which operates in accordance with the point management program 14A.

In this embodiment, the stock price acquisition unit 15 has a function of accessing, when a stock price linkage timing T comes, the stock price providing server 30 via the communication network NW from the communication I/F unit 11, and acquiring the new stock price P(T) of the company linked with each kind of stock points managed in the point DB 14B.

The terminal processing unit 16 is configured to read out the balance of the points owned by the user from the point DB 14B in response to a request from the user, and notify, via the communication network NW, the user terminal 20 of the user of the readout balance.

The terminal processing unit 16 corresponds to a "terminal processing circuit" according to the present invention. In this embodiment, the terminal processing unit 16 is implemented by the CPU 10A which operates in accordance with the point management program 14A.

In this embodiment, the terminal processing unit 16 has a function of accepting various requests from the Web browser of the user terminal 20 via the communication I/F unit 11 and the communication network NW based on a communication protocol such as HTTP, a function of instructing the point management unit 17 to newly register designated stock points in response to a new registration request from the user terminal 20, and a function of acquiring, from the point DB 14B, the new point balance X(T) of the user obtained by the update operation of the point management unit 17 in response to a balance inquiry request from the user terminal 20, and notifying the user terminal 20 of the acquired point balance.

The point management unit 17 registers, in the point issuance table, information (to be referred to as "point information" hereinafter) about the stock points awarded to the user in response to an operator's operation in the operation input unit 12 or various instructions sent from an external apparatus.

More specifically, the point management unit 17 is configured to update the balance of the points owned by the user, which is stored in the data of the point DB 14B by calculating the balance of the points owned by the user based on the new stock price (to be referred to as the "stock price at the time of update" hereinafter) of the designated company at the stock price linkage timing T, the balance of the points owned by the user, which has been read out from the point DB 14B, and the stock information used to calculate the point balance.

The point management unit 17 corresponds to an "arithmetic unit" according to the present invention. In this embodiment, the point management unit 17 is implemented by the CPU 10A which operates in accordance with the point management program 14A.

To link the point balance with the stock price, in this embodiment, the point management unit 17 reads out, from the point DB 14B, the point rate R indicating the amount of money per sp (unit point), the number Q of distributed shares corresponding to the number of points awarded to the user, and the new stock price (the stock price at the time of update) P(T) of the designated company, when the stock price linkage timing T comes, and calculates the new point balance X(T) at the stock price linkage timing T, thereby updating the point balance table. At this time, the new point balance X(T) at the stock price linkage timing T is calculated by:

$$X(T)=Q\times P(T)/R \quad (1)$$

Operation of First Embodiment

Figure 5:
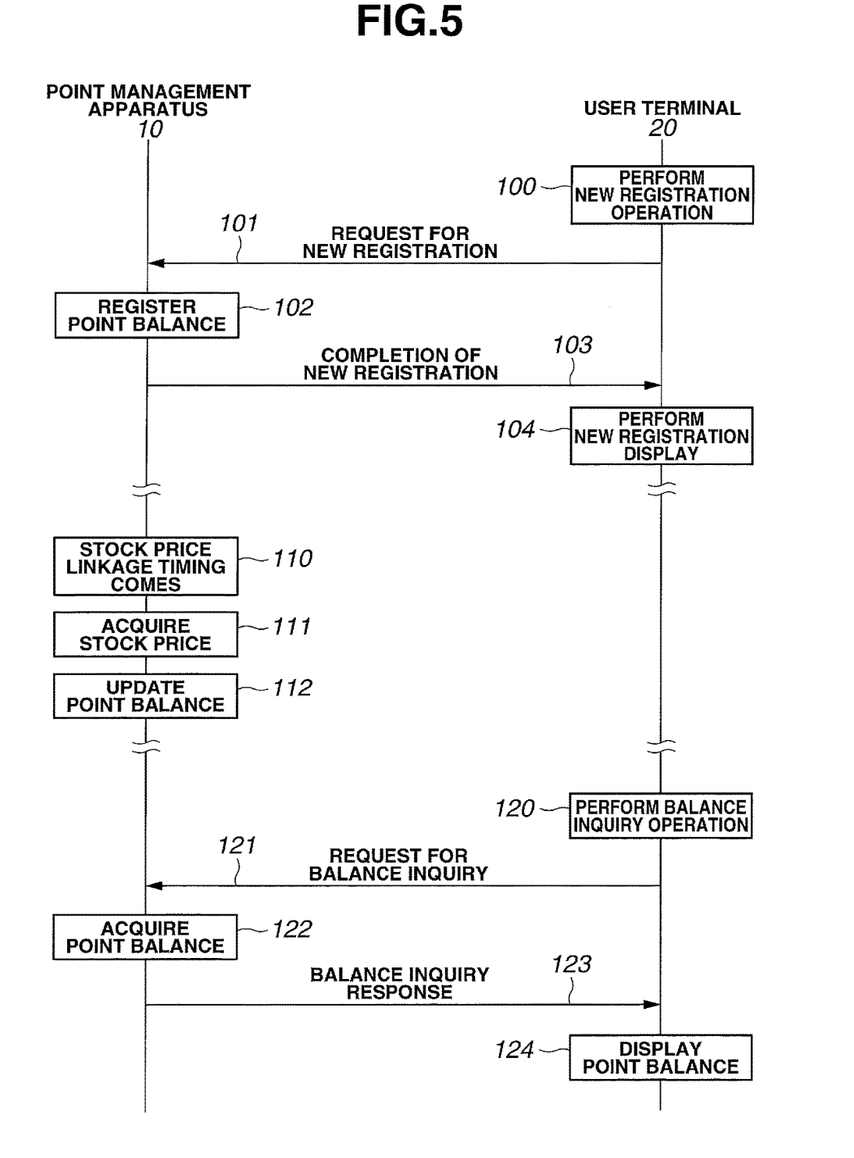
FIG. 5 is a sequence chart showing the operation of the point management system according to the first embodiment.

The operation of the point management system 1 according to this embodiment will be described next with reference to FIG. 5. FIG. 5 is a sequence chart showing the operation of the point management system according to the first embodiment.

Processing of newly registering stock points, processing of linking a point balance with a stock price, and point balance inquiry processing will be described.

[New Registration Processing]

The processing of newly registering stock points will be described first. This new registration processing is executed when the user newly registers awarded points having a point ID which has not been registered.

If, after acquiring, in the user terminal 20, encrypted data of a point ID associated with the awarded points and the number ΔX of points (to be referred to as "the number of new points" hereinafter) to be newly registered, the user accesses the point management apparatus 10 via the Web browser of the user terminal 20, and performs an operation of newly registering the stock points (step 100), a new registration request containing the encrypted data about the awarded points and the user ID of the user is transmitted from the user terminal 20 to the point management apparatus 10 (step 101).

In response to the new registration request from the user terminal 20, the terminal processing unit 16 of the point management apparatus 10 instructs the point management unit 17 to newly register the stock points.

In response to the instruction, the point management unit 17 extracts the point ID and the number ΔX(T0) of points (to be referred to as "the number of new points" hereinafter) to be newly registered from the encrypted data contained in the new registration request, and acquires, from the point issuance table in the point DB 14B, the point rate R, reference date and time T0, and reference stock price P(T0), all of which correspond to the point ID.

Subsequently, based on the number ΔX(T0) of new points, the rate R, and the reference stock price P(T0), the point management unit 17 calculates the number Q of distributed shares corresponding to the stock points to be newly registered, by:

$$Q=\Delta X(T0)\times R/P(T0) \quad (1a)$$

Equation (1a) is obtained by modifying equation (1) above.

The point management unit 17 registers, in the point balance table in the point DB 14B, the number ΔX(T0) of new points, the reference date and time T0, and the number Q of distributed shares as the point balance X(T0), the update date and time T0, and the number Q of distributed shares, all of which correspond to the point ID of the user ID (step 102).

After that, the terminal processing unit 16 acquires, from the point balance table in the point DB 14B, the point balance X(T0) of the user ID as the request source of the new registration request, and notifies the corresponding user terminal 20 of completion of new registration including the point balance X(T0) (step 103).

Thus, the point balance X(T0) is displayed on a screen using the Web browser of the user terminal 20, and the user confirms that the processing of newly registering the awarded stock points is complete (step 104).

[Stock Price Linkage Processing]

The processing of linking the point balance with the stock price will be described. The stock price linkage processing is intermittently executed in accordance with the stock price linkage timing.

When the stock price linkage timing comes (step 110), the point management unit 17 of the point management apparatus 10 instructs the stock price acquisition unit 15 to acquire the stock price, and the stock price acquisition unit 15 accesses the stock price providing server 30 in response to the instruction, thereby acquiring the stock price, at this time, of the designated company, which is managed in the point DB 14B, that is, the new stock price P(T) (step 111).

Subsequently, for each kind of stock points of each user managed in the point DB 14B, the point management unit 17 calculates the point balance X(T) based on the new stock price P(T), thereby performing update processing (step 112).

More specifically, for each set of the user ID and point ID registered in the point balance table in the point DB 14B, the point balance X(T) is calculated based on equation (1) above, thereby performing update processing. This automatically updates the point balance of each user in linkage with the stock price of the designated company at each stock price linkage timing.

[Balance Inquiry Processing]

The point balance inquiry processing will be described next. The balance inquiry processing is executed in response to a balance inquiry request from the user.

If the user accesses the point management apparatus 10 using the Web browser of the user terminal 20, and performs a stock point balance inquiry operation (step 120), a balance inquiry request about the stock points held by the user is transmitted from the user terminal 20 to the point management apparatus 10 (step 121).

The terminal processing unit 16 of the point management apparatus 10 acquires, in response to the balance inquiry request from the user terminal 20, the point balance X(t) corresponding to the user ID designated by the balance inquiry request from the point balance table in the point DB 14B (step 122), and notifies the corresponding user terminal 20 of a balance inquiry result including the point balance X(t) (step 123).

Thus, the point balance X(T) is displayed on the screen using the Web browser of the user terminal 20, and the user confirms the point balance of the stock points linked with the stock price of the designated company (step 124).

Note that communication between the point management apparatus 10 and the user terminal 20 is performed based on a protocol such as HTTP.

Example of Operation of First Embodiment

Figure 6A:
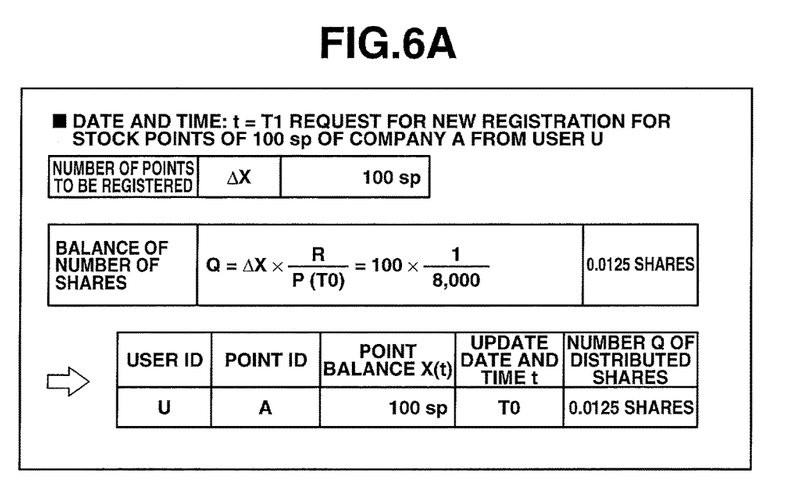
FIG. 6A is a view for explaining an example of the operation of the point management system according to the first embodiment.
Figure 6B:
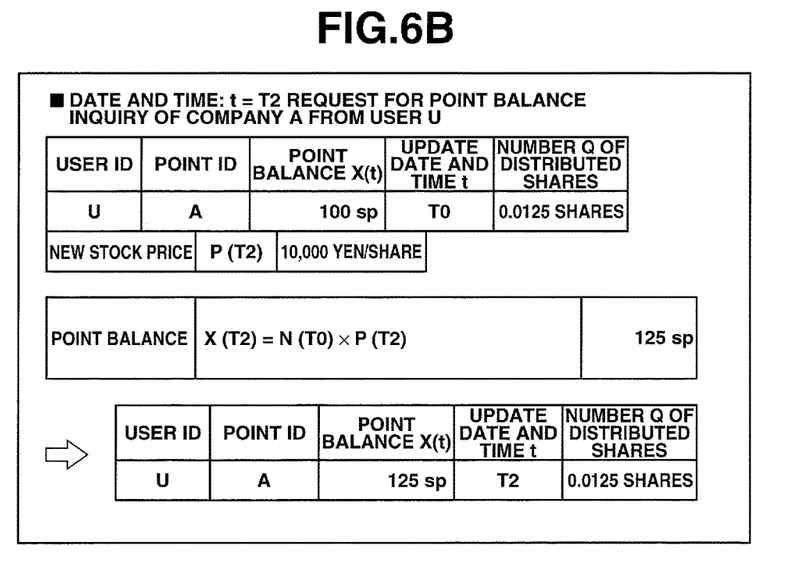
FIG. 6B is a view for explaining the example of the operation of the point management system according to the first embodiment.

An example of the operation of the point management system 1 according to this embodiment will be described with reference to FIGS. 6A and 6B.

As shown in FIG. 2B, at the date and time T0, the company A distributes the stock points of 1,000,000 sp as security for 125 shares purchased based on the reference stock price P(T0)=8,000 yen.

If a user U purchases a product of the company A, and performs, in the user terminal 20, at a date and time T1, a new registration operation of newly registering stock points of 100 sp assigned to the product, a new registration request containing the user ID=U, the point ID=A, and the number ΔX(T0) of points to be newly registered (the number of new points)=100 sp is transmitted from the user terminal 20 to the point management apparatus 10.

In response to the new registration request, the point management unit 17 of the point management apparatus 10 acquires, from the point issuance table in the point DB 14B, the point rate R, the distribution date and time t=T0, and the reference stock price P(T0)=8,000 yen/share, all of which are associated with the point ID=A, and calculates, based on equation (1a) above, the number Q of distributed shares=100×1/8,000=0.0125 corresponding to the stock points to be newly registered (the number of new points).

The point management unit 17 registers the number ΔX(T0) of new points=100 sp, the distribution date and time t=T0, and the number Q of distributed shares=0.0125, all of which are designated by the new registration request, in the point balance table in the point DB 14B as the point balance X(T0)=100 sp of the points identified by the point ID=A of the user ID=U designated by the new registration request, the update date and time t=T0, and the number Q of distributed shares=0.0125.

After that, if the stock price linkage timing comes at a date and time T2, the point management unit 17 updates, based on a new stock price P(T2) of each company at the date and time T2 acquired by the stock price acquisition unit 15, the point balance X(t) of each kind of stock points registered in the point balance table in the point DB 14B.

For example, as for the stock points associated with the point ID=A of the user ID=U, the number Q of distributed shares=0.0125 is acquired from the point balance table. Based on the new stock price P(T2)=10,000 yen/share of the company A as the designated company of the stock points, the new point balance X(T2)=0.0125×10,000/1=125 sp is calculated by equation (1) above.

This registers, in the point balance table, the new point balance X(T2)=125 sp and the date and time T2 as the point balance X(t) of the points identified by the point ID=A of the user ID=U and the update date and time t.

Therefore, after that, if the user terminal 20 sends a balance inquiry request concerning the point ID=A of the user ID=U, the corresponding point balance X(T2)=125 sp is acquired from the point balance table and sent to the user terminal 20.

Figure 7:
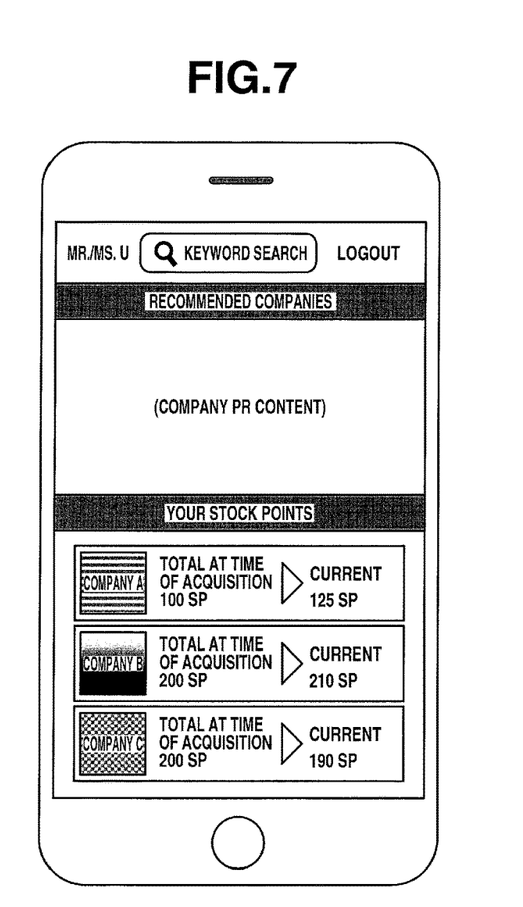
FIG. 7 is a view showing an example of a stock point balance inquiry screen in the point management system according to the first embodiment.

FIG. 7 shows an example of a stock point balance inquiry screen. FIG. 7 shows, as an example, a balance inquiry screen when the user U holds three kinds of stock points of the company A and companies B and C. For each kind of stock points, the total number of points at the time of acquisition, which indicates the number of new points newly registered at a new registration date and time, and the current number of points indicating the latest point balance updated in accordance with the stock price of the designated company at a balance inquiry date and time are displayed together with an icon representing the designated company.

Effect of First Embodiment

In the point management system according to this embodiment, the balance of the points awarded to the user can be linked with the stock price of the designated company which has awarded the points. More specifically, the point management unit 17 can link the point balance with the stock price by updating the point balance based on the number of shares distributed to the user and the stock price at the time of update. In response to a balance inquiry request from the user terminal 20, which indicates an inquiry about the point balance, the terminal processing unit 16 can notify the user terminal 20 of the new point balance of the user, which has been obtained by the update processing.

Since the point balance of the stock points changes in linkage with the stock price of the designated company, the user holding the points becomes aware of the stock price of the designated company. Therefore, the user is motivated or intends to support the designated company so that its stock price rises and its performance is improved, resulting in improvement in user's loyalty to the company.

Second Embodiment

A point management system 1 according to the second embodiment of the present invention will be described.

The above-described first embodiment has explained the example in which the number of distributed shares is managed, for each kind of stock points of the user U, as stock information used to calculate the point balance. This embodiment will describe an example in which a stock price at the time of update of a point balance is managed as stock information, instead of the number of distributed shares.

In this embodiment, a point management unit 17 has a function of linking a point balance with a stock price by calculating, when a stock price linkage timing T comes, a new point balance $X(T)$ at T based on a point balance $X(T-1)$ of the user, which is registered in a point DB 14B and has been updated at a stock price linkage timing $T-1$ immediately before T, a stock price $P(T-1)$ at the time of update of a designated company, which has been used for the last update processing, and a new stock price $P(T)$ at the time of update of the designated company, which is to be used for this update processing, and then performing the update processing. At this time, the new point balance $X(T)$ at T is obtained by:

$$X(T)=X(T-1) \times P(T)/P(T-1) \qquad (3)$$

Figure 8:
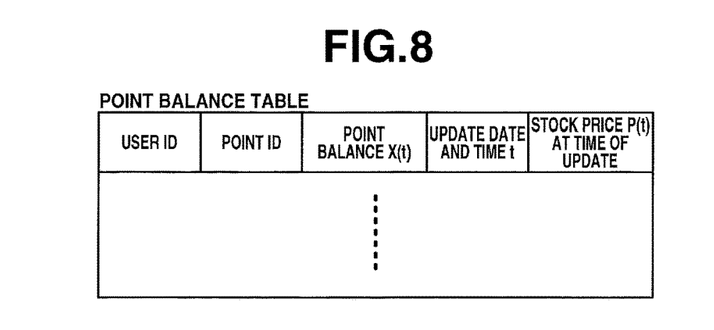
FIG. 8 is a table showing an example of the structure of a point balance table in a point management system according to the second embodiment.

FIG. 8 shows an example of the structure of a point balance table according to the second embodiment. The point balance table is a table in which information about the point balance of the stock points held by the user is registered. The point management unit 17 registers and updates the information about the point balance when various requests are received from a user terminal 20 or the stock price linkage timing comes.

In the example of FIG. 8, for each user ID for identifying a user, a set of a point ID, a point balance $X(t)$, an update date and time t at which the point balance $X(t)$ is updated, and a stock price $P(t)$ at the time of update, which has been used to update the point balance $X(t)$ at the update date and time t, is registered.

The remaining components related to the point management system 1 and a point management apparatus 10 according to this embodiment are the same as in the first embodiment and a detailed description thereof will be omitted.

Operation of Second Embodiment

The operation of the point management system 1 according to this embodiment will be described.

The operation of the point management system 1 according to this embodiment is almost the same as that shown in the sequence of FIG. 5 described above. However, some of processing contents by the point management apparatus 10 are different, and different parts of processing of newly registering stock points, processing of linking a point balance with a stock price, and point balance inquiry processing will be described.

[New Registration Processing]

The processing of newly registering stock points will be described first. This new registration processing is executed when the user newly registers awarded points having a point ID which has not been registered.

This embodiment is different in that a stock price $P(T0)$ at the time of update is registered, in step 102 of FIG. 5, in the point balance table in the point DB 14B, instead of the number Q of distributed shares.

That is, the point management unit 17 extracts a point ID and the number $\Delta X(T0)$ of new points from encrypted data contained in a new registration request, acquires a reference date and time T0 and a reference stock price $P(T0)$, both of which correspond to the point ID, from a point issuance table in the point DB 14B, and registers them, in the point balance table in the point DB 14B, as the update date/time T0 and the stock price $P(T0)$ at the time of update, both of which correspond to the point ID of the user ID, while registering the number $\Delta X(T0)$ of new points as a point balance $X(T0)$ corresponding to the point ID of the user ID (step 102).

[Stock Price Linkage Processing]

The processing of linking the point balance with the stock price will be described. The stock price linkage processing is intermittently executed in accordance with the stock price linkage timing.

At this time, this embodiment is different in that a point balance $X(T2)$ is calculated, in step 112 of FIG. 5, based on equation (3) using the stock price $P(T0)$ at the time of update, instead of equation (1) using the point rate R and the number Q of distributed shares.

That is, for each set of the user ID and point ID registered in the point balance table in the point DB 14B, the point management unit 17 calculates the point balance $X(T)$ based on equation (3) above, thereby performing update processing. This automatically updates the point balance of each user in linkage with the stock price of the designated company at each stock price linkage timing.

Example of Operation of Second Embodiment

Figure 9A:
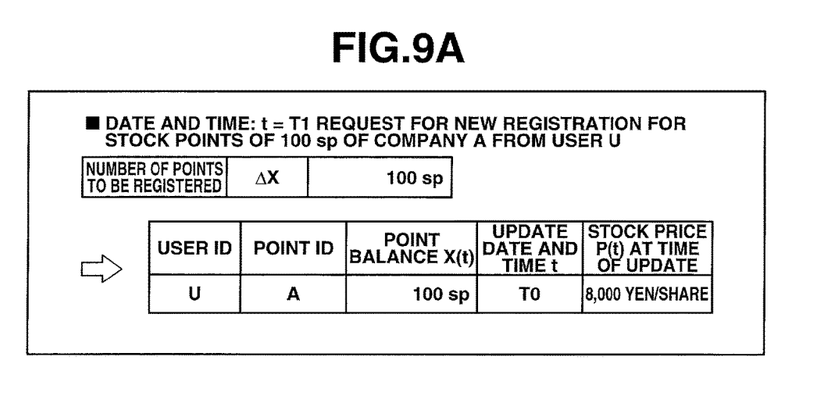
FIG. 9A is a view for explaining an example of the operation of the point management system according to the second embodiment.
Figure 9B:
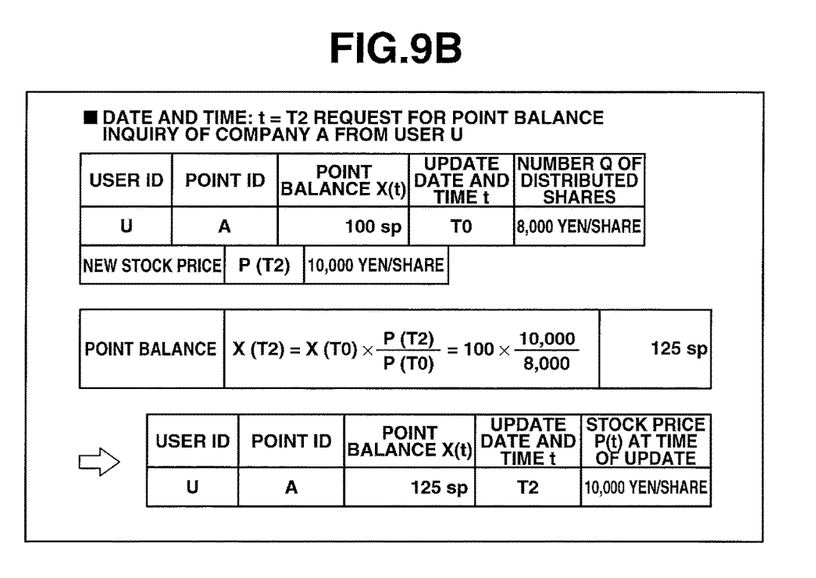
FIG. 9B is a view for explaining the example of the operation of the point management system according to the second embodiment.

An example of the operation of the point management system 1 according to this embodiment will be described with reference to FIGS. 9A and 9B.

As shown in FIG. 2B, at the date and time T0, stock points of 1,000,000 sp are awarded from a company A as security for 125 shares purchased based on the reference stock price $P(T0)=8,000$ yen.

If a user U purchases a product of the company A, and performs, in the user terminal 20, at a date and time T1, a new registration operation of newly registering stock points of 100 sp assigned to the product, a new registration request containing the user ID=U, the point ID=A, and the number $\Delta X(T0)$ of new points=100 sp is transmitted from the user terminal 20 to the point management apparatus 10.

In response to the new registration request, the point management unit 17 of the point management apparatus 10 acquires, from the point issuance table in the point DB 14B, the distribution date and time t=T0 and the reference stock price P(T0)=8,000 yen/share, both of which are associated with the point ID=A, and registers, in the point balance table in the point DB 14B, the acquired data as the update date and time t=T0 and the stock price (T0) at the time of update=8,000 yen/share, both of which are associated with the point ID=A of the user ID=U designated by the new registration request while registering the number ΔX(T0) of new points=100 sp designated by the new registration request as the point balance X(T0)=100 sp identified by the point ID=A of the user ID=U.

After that, if the stock price linkage timing comes at a date and time T2, the point management unit 17 updates, based on a new stock price P(T2) of each company at the date and time T2, which has been acquired by the stock price acquisition unit 15, the point balance X(t) of each kind of stock points registered in the point balance table in the point DB 14B.

For example, as for the stock points associated with the point ID=A of the user ID=U, the point balance X(T0)=100 sp and the stock price P(T0) at the time of update=8,000 yen/share are acquired from the point balance table, and a new point balance X(T2)=100×10,000/8,000=125 sp is calculated by equation (1) above, based on the new stock price P(T2)=10,000 yen/share of the company A as the designated company of the stock points.

This registers the new point balance X(T2)=125 sp, T2, and P(T2)=10,000 yen/share in the point balance table as the point balance X(T) of the points identified by the point ID=A of the user ID=U, the update date and time t, and the stock price P(t) at the time of update.

Therefore, if, after that, the user terminal 20 sends a balance inquiry request about the point ID=A of the user ID=U, the corresponding point balance X(T2)=125 sp is acquired from the point balance table, and sent to the user terminal 20.

Effect of Second Embodiment

As described above, in this embodiment, stock-price-linked points whose point balance is linked with the stock price of the designated company which has awarded the points are used as points awarded to the user, the point management unit 17 links the point balance with the stock price by updating the point balance based on the stock price at the time of update of the designated company, which has been used to update the point balance of the user last time and the new stock price at the time of update of the designated company which is to be used for update this time, and the terminal processing unit 16 notifies, in response to a balance inquiry request indicating an inquiry about the point balance from the user terminal 20, the user terminal 20 of the new point balance of the user which has been obtained by update processing.

Therefore, since the point balance of the points (stock points) according to this embodiment changes in linkage with the stock price of the designated company, the user who holds the points becomes aware of the stock price of the designated company. Thus, the user is motivated or intends to support the designated company so that its stock price rises and its performance is improved, resulting in improvement in user's loyalty to the company.

In addition, the stock price P(t) at the time of update is managed for each kind of stock points of the user U, and the stock price is data common to different users U. Thus, for example, the stock price can be uniquely specified based on the company ID and the update date/time t corresponding to the point ID. Therefore, it is possible to collectively manage the stock price among the different users U. Especially, if the closing stock price is used, this price can be acquired from the stock price providing server 30, as needed, without performing management in the point management apparatus 10. Therefore, unlike the first embodiment, it becomes unnecessary to manage the number of distributed shared for each kind of stock points of the user U. Consequently, it is possible to largely reduce the scale of the point balance table in the point DB 14B.

Third Embodiment

Figure 10:
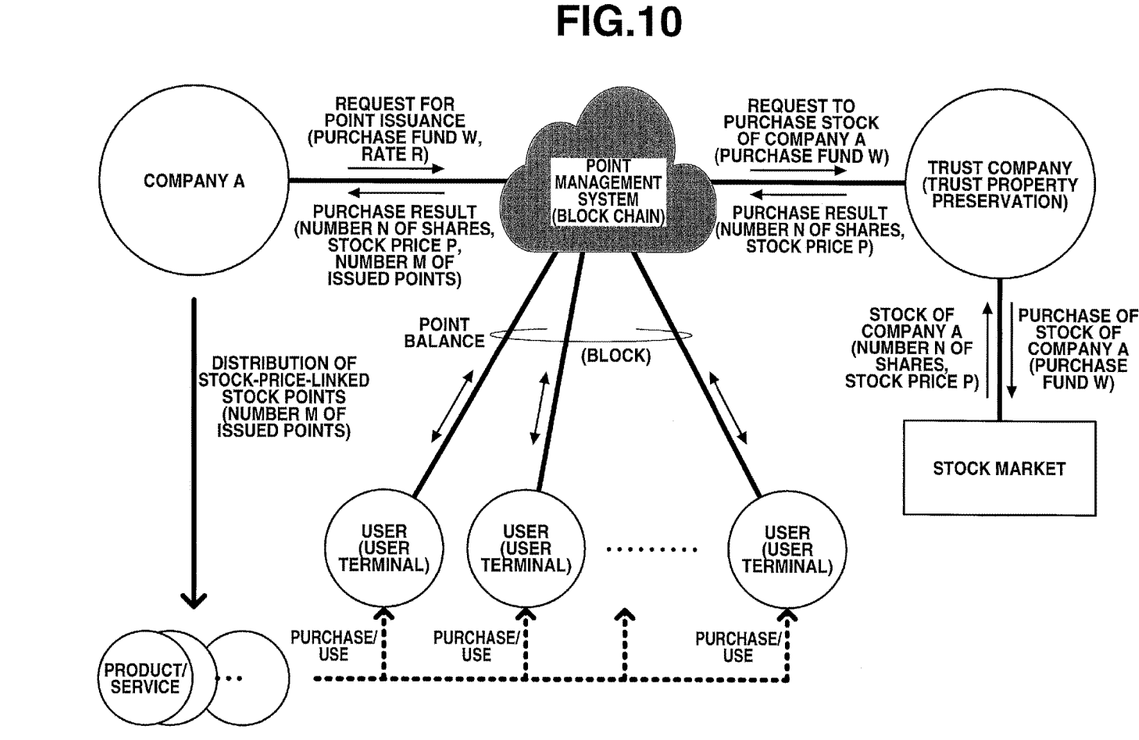
FIG. 10 is a view showing an overview of a point management system according to the third embodiment.

A point management system 1 according to the third embodiment of the present invention will be described with reference to FIG. 10. FIG. 10 is a view showing an overview of the point management system according to the third embodiment.

The above-described first and second embodiments have exemplified a case in which if the point management apparatus 10 collectively manages the point balance of each user, and notifies the user terminal 20 of the point balance, this notification processing is performed using a communication protocol such as HTTP.

This embodiment will describe a case in which each user terminal 20 distributedly manages a point balance together with a point management apparatus 10 using a blockchain technology, instead of collectively managing the point balance of each user by the point management apparatus 10.

As described in, for example, "Mechanism of Blockchain Technology and Its Possibilities" (Finance Information Technology Focus 2015.10, Nomura Research Institute), the blockchain technology is a technique of storing a transaction indicating details of a deal associated with a given financial operation in information called a block whose continuity is guaranteed, broadcasting the information to all participants, verifying the received block based on a blockchain formed by blocks received so far, and executing the deal based on the transaction contained in the block for which correctness is obtained.

In this embodiment, instead of the protocol such as HTTP, the blockchain technology is used to exchange the point balance between the point management apparatus 10 and the user terminal 20, as shown in FIG. 10. Note that a procedure up to point issuance is the same as that shown in FIG. 2A described above.

More specifically, a terminal processing unit 16 has a function of, when notifying the user terminal 20 of the updated point balance of the user, describing the contents of a transaction associated with update of the point balance in a new block of a blockchain virtually created in a communication network NW, and broadcasting the block to the communication network NW.

The user terminal 20 has a function of verifying, based on the blockchain, the block received from the communication network, and presenting, to the user, the updated point balance of the user based on the contents of the transaction contained in the block for which correctness is obtained.

The blockchain processing in the terminal processing unit 16 and the user terminal 20 is implemented using a general processing module.

Effect of Third Embodiment

As described above, in this embodiment, since the point balance is exchanged between the point management apparatus 10 and the user terminal 20 using the blockchain technology, the point balance can be exchanged while ensuring high security, and it is possible to more securely circulate stock-price-linked points.

Modification of Embodiments

The present invention has been described above with reference to the embodiments, but the present invention is not limited to these embodiments. Various changes understandable by those skilled in the art can be made for the arrangements and details of the present invention without departing from the scope of the invention. In addition, the embodiments can be arbitrarily combined and implemented within a consistent range.

What is claimed is:

1. A point management apparatus comprising:
   a storage device configured to store point information relating to points awarded to a user, the point information including a point ID for identifying the points, a point rate indicating an amount of money per unit point of the points, a stock price and a number of shares of a designated company at a time of purchase of a stock of the designated company as capital for the points, a user ID for identifying the user, a balance of points owned by the user identified by the user ID, and stock information on a stock of the designated company that is used to calculate the balance of the points;
   an arithmetic circuit configured to update the balance of the points owned by the user that is stored in the storage device, by calculating the balance of the points owned by the user, based on a more recent stock price of the designated company than that of the purchased stock price, the balance of the points owned by the user read from the storage device, and the stock information read from the storage device;
   a communication interface configured to be connected to a communication network; and
   a terminal processor configured to read the balance of the points owned by the user from the storage device in response to a request from the user, and notify a terminal apparatus of the user of the balance via the communication network.

2. The apparatus according to claim 1, wherein the stock information indicates the number of shares corresponding to the number of points awarded to the user.

3. The apparatus according to claim 2, wherein when the point rate is represented by R, the number of shares corresponding to the number of points awarded to the user is represented by Q, and the more recent stock price of the designated company at an update timing T at which the balance of the points is updated is represented by $P(T)$, the arithmetic circuit calculates a balance $X(T)$ of points owned by the user at the update timing T by:

$$X(T)=Q \times P(T)/R \qquad (1).$$

4. The apparatus according to claim 2, wherein the arithmetic circuit is configured to read, in response to a new registration request of the number of points awarded to the user, from the storage device, the point rate corresponding to a point ID contained in the new registration request, and the stock price of the designated company at the time of the purchase as capital for the points corresponding to the point ID, calculate, based on the read point rate and the stock price of the designated company at the time of the purchase as capital for the points, the number of shares corresponding to the number of new points contained in the new registration request, and store the calculated number of shares in the storage device.

5. The apparatus according to claim 1, wherein the stock information indicates the stock price of the designated company used to update the balance of the points of the user.

6. The apparatus according to claim 5, wherein when the point rate is represented by R, the more recent stock price of the designated company at an update timing T at which the balance of the points is updated is represented by $P(T)$, the balance of the points of the user immediately before the update timing is represented by $X(T-1)$, and the stock price of the designated company used to update the balance of the points of the user at a previous time is represented by $P(T-1)$, the arithmetic circuit calculates the balance $X(T)$ of the points owned by the user at the update timing T by:

$$X(T)=X(T-1) \times P(T)/P(T-1) \qquad (2).$$

7. The apparatus according to claim 1, further comprising:
   a stock price acquisition circuit configured to acquire the more recent stock price of the designated company over the communication network.

8. The apparatus according to claim 1, wherein the storage device stores
   a first table for associating, with each other, the point ID for identifying the points, the point rate indicating the amount of money per unit point of the points, and the stock price and the number of shares of the designated company at the time of the purchase as capital for the points, and
   a second table for associating, with each other, the user ID for identifying the user, the balance of the points owned by the user identified by the user ID, and the stock information.

9. A point management system comprising:
   a point management apparatus configured to manage a balance of points awarded to a user; and
   a terminal apparatus of the user connectable to the point management apparatus via a communication network,
   the point management apparatus including
   a storage device configured to store point information relating to the points awarded to the user, the point information including a point ID for identifying the points, a point rate indicating an amount of money per unit point of the points, a stock price and a number of shares of a designated company at a time of purchase of a stock of the designated company as capital for the points, a user ID for identifying the user, a balance of points owned by the user identified by the user ID, and stock information on a stock of the designated company that is used to calculate the balance of the points,
   an arithmetic circuit configured to update the balance of the points owned by the user that is stored in the storage device, by calculating the balance of the points owned by the user, based on a more recent stock price of the designated company than that of the purchased stock, the balance of the points owned by the user read from the storage device, and the stock information read from the storage device,
   a communication interface configured to be connected to the communication network, and
   a terminal processor configured to read the balance of the points owned by the user from the storage device, in response to a request from the user, and notify a terminal apparatus of the user of the balance via the communication network.

10. The system according to claim 9, wherein the stock information indicates the number of shares corresponding to the number of points awarded to the user.

11. The system according to claim 9, wherein the stock information indicates the stock price of the designated company used to update the balance of the points of the user.

12. The system according to claim 9, further comprising:
a stock price providing server configured to provide the stock price of the designated company,
wherein the point management apparatus further includes a stock price acquisition circuit configured to acquire the more recent stock price of the designated company from the stock price providing server over the communication network.

13. The system according to claim 9, wherein the terminal processor is configured to describe, when notifying the terminal apparatus of the user of the balance of the points owned by the user updated by the arithmetic circuit, a detail of a transaction associated with the updating of the balance of the points in a new block of a blockchain created over the communication network and broadcast the block over the communication network, and
the terminal apparatus of the user is configured to verify, based on the blockchain, the block received over the communication network, and display the updated balance of the points of the user based on the detail of the transaction contained in the block for which correctness is confirmed.

14. A point management method for a point management system including a communication interface configured to be connected to a communication network, a point management apparatus configured to manage a balance of points awarded to a user, and a terminal apparatus of the user connectable to the point management apparatus via the communication network, the method comprising:
a step of storing, in a storage device, point information relating the points awarded to the user, the point information including a point ID for identifying the points, a point rate indicating an amount of money per unit point of the points, a stock price and a number of shares of a designated company at a time of purchase of a stock of the designated company as capital for the points, a user ID for identifying the user, a balance of points owned by the user identified by the user ID, and stock information on a stock of the designated company that is used to calculate the balance of the points,
a step of updating the balance of the points owned by the user that is stored in the storage device, by calculating the balance of the points owned by the user, based on a more recent stock price of the designated company than that of the purchased stock, the balance of the points owned by the user read from the storage device, and the stock information read from the storage device; and
a step of reading, in response to a request from the user, the balance of the points owned by the user from the storage device, and notifying the terminal apparatus of the user of the balance via the communication network.

15. The method according to claim 14, wherein the stock information indicates the number of shares corresponding to the number of points awarded to the user.

16. The method according to claim 14, wherein the stock information indicates the stock price of the designated company used to update the balance of the points of the user.

* * * * *